April 22, 1924.  1,491,725
J. G. NEEDHAM ET AL
HEAT INSULATING MATERIAL AND PROCESS OF PRODUCING THE SAME
Filed May 31, 1921
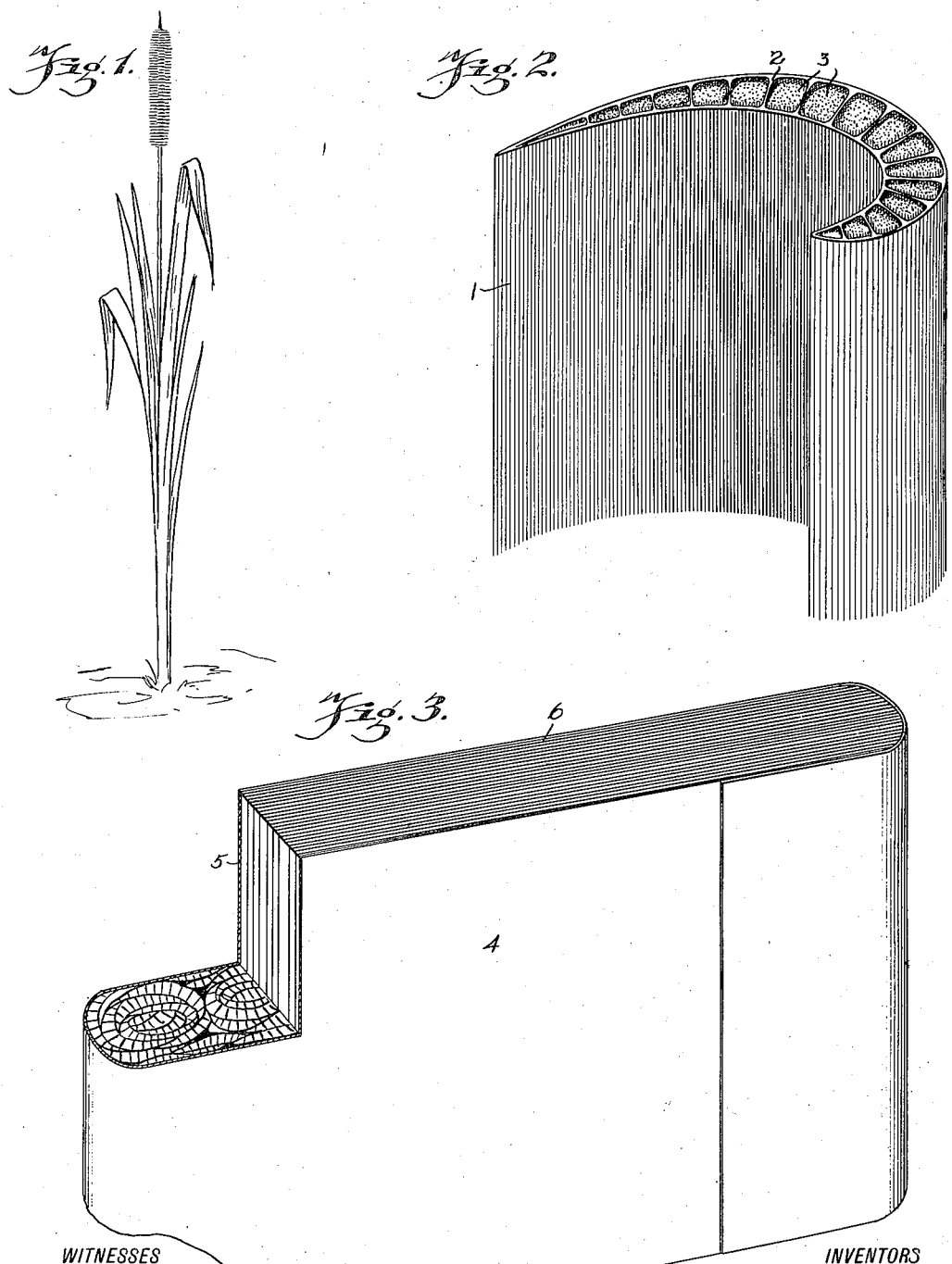
WITNESSES
INVENTORS
JAMES G. NEEDHAM
PETER W. CLAASSEN
BY
ATTORNEYS

Patented Apr. 22, 1924.

1,491,725

UNITED STATES PATENT OFFICE.

JAMES G. NEEDHAM AND PETER W. CLAASSEN, OF ITHACA, NEW YORK.

HEAT-INSULATING MATERIAL AND PROCESS OF PRODUCING THE SAME.

Application filed May 31, 1921. Serial No. 473,953.

*To all whom it may concern:*

Be it known that we, JAMES G. NEEDHAM, and PETER W. CLAASSEN, citizens of the United States, and residents of Ithaca, in the county of Tompkins and State of New York, have invented a new and Improved Heat-Insulating Material and Processes of Producing the Same, of which the following is a full, clear, and exact description.

This invention relates to a new and improved article of manufacture, and has for an object the provision of an article of manufacture especially adaptable for use as a heat insulating material and as a buoyant medium.

Another object resides in the provision of means whereby heat insulating and buoyant body portions may be very simply, readily and economically formed.

A further object resides in the provision of a new article of manufacture in the form of a heat insulating and buoyant body portion made of materials available for use in their natural state without any complicated or expensive treatment, and available in large quantities throughout the country.

A still further object resides in the provision of a heat insulating and buoyant material as a new article of manufacture which is capable of being formed in any desired shape, such as in sheets or layers or blocks, to be used as heat insulators or as buoyant agents.

Another object resides in the provision of a new article of manufacture formed of the leaves and stems of aquatic plants of the genus Typha, commonly known as cat-o'-nine-tails.

The invention in general comprises the formation of a body portion to be used as a buoyant or heat insulating medium or agent, and which body portion is formed of the leaves and stems of aquatic plants of the genus Typha, lightly pressed together in the desired shape. These elements can be formed in sheets or blocks of any desired form, and under suitable conditions are to be covered with any suitable or desirable air- and waterproof covering, such as by a layer of paper covered with pitch or asphaltum compound.

The invention is illustrated in the drawings, of which—

Figure 1 is a perspective view of an aquatic plant of the genus Typha;

Figure 2 is an enlarged view partly in section through one of the leaves of the plant; and Figure 3 is a view of a package formed of a plurality of the leaves and stems of the aquatic plant bound together by a covering material.

The preferred form of our invention, as shown in the drawings, relates to the use of the leaves and stems of aquatic plants, such as those of the genus Typha. These plants are smooth herbs with strong creeping rootstocks from which grow erect and often tall and robust stems. The leaves are chiefly radical, long and linear. The plant generally grows to a height of five to nine feet. These leaves and stems are of very low specific gravity, being of a specific gravity of less than one-half that of cork. The specific gravity of cork is approximately 0.182, whereas the specific gravity of cat-tail leaves and stems (either species) is approximately 0.0743. The leaves and the stems of these plants are formed naturally into a large number of small, separate air compartments which render the use of these portions of the plants very important for heat insulation and for buoyant agents.

Both the heat insulating and buoyant values of these portions of the plants are due to the multitude of small, closed air-holding compartments of which the stems and leaves are manifestly made up.

For instance, referring to Fig. 2, a section of one of the leaves is shown. This leaf has a body portion 1 of the form shown, divided by a plurality of longitudinal partitions, such as 2, into a large number of parallel compartments 3. Each of these major compartments is subdivided by horizontal partitions into a large number of small compartments or air cells, so that the total volume of the leaves is largely air space. The horizontal partitions of the several rows are not arranged in transverse lines, but are staggered as are the bricks in a wall.

In the manufacture of these stems and leaves into body portions suitable for heat insulation or buoyant purposes, we propose to bind the required amount of the leaves and stems together with pitch, agglutinants, or adhesive. They may also be bound together by sewing or by tying or by any other means that will bind the leaves and stems together without any considerable degree of pressure therebetween, in order that the construction of the air cells shall not be affected. It is on the preservation of the air cells within the leaves and stems that the efficiency of this material for both heat insulation and buoyancy depends. This arrangement of plant tissues is especially advantageous for holding air in a multitude of minute closed air spaces, and it is peculiar to plants of the genus Typha.

As shown in Fig. 3, it may be desirable under certain conditions to form the desired quantity of these leaves and stems in the shape of a sheet or block, such as 4. This block or sheet may be covered by suitable fabric, such as a layer of paper 5, which can be coated with a layer 6, on all sides, of coal tar pitch or other air- and waterproof material. In Fig. 3 the section has been cut away to show the manner in which the leaves are arranged when lightly pressed together in the form of blocks or sheets. Of course, these blocks or sheets can be made in any desired size and dimensions as required by the practical use to which they are to be put. Large blocks of insulating or buoyant material may be made by binding these leaves and stems together with agglutinants or adhesives, to the end that sheets or blocks of this material may be obtained therefrom of any desired dimensions by sawing or slicing the blocks. Sheets so obtained may be waterproofed and coated as above described. In combining entire leaves and stems into sheets, uniform thickness may be obtained by placing butts and tops alternately in opposite directions, since the butts are thicker than the tops. Material for sheets and for stuffing any sort of containers for heat insulating or buoyant purposes may be obtained by mechanically slicing or shredding the leaves or stems or the broken fragments and the trimmings of the same.

This material formed as above described is particularly adaptable for use in cold-storage plants, in roofs, and other situations where a light, efficient heat insulating material is desired. It is, of course, understood that the invention does not reside in the formation of any particular size or form of body portion involving the use of these elements but mainly consists in the use and formation of body portions comprising these plants for the purposes above set forth.

What we claim is:

1. As a new article of manufacture, a body portion comprising a plurality of leaves and stems of an aquatic plant of the genus Typha lightly pressed together, a binding agent for holding the leaves and stems together, a covering for said body portion, and a layer of water- and airproof material over said covering.

2. A heat insulating and buoyant medium, which comprises a body portion formed of a plurality of lightly packed leaves and stems of an aquatic plant of the genus Typha, a binder or adhesive agent applied to said leaves and stems, and a water- and airproof covering for said body portion.

3. As a new article of manufacture, a body portion comprising a plurality of leaves and stems of an aquatic plant of the genus Typha lightly pressed together, a binding agent for holding the leaves and stems together, a cover for said body portion, and a layer of water- and airproof material over said cover.

4. The process of manufacturing an insulating and buoyant body portion of the leaves and stems of aquatic plants of the genus Typha, which comprises lightly packing said leaves and stems together with a pressure insufficient to destroy their cellular structure, applying a binding agent thereto, and then applying an agent to the body portion to make the same water- and airproof.

JAMES G. NEEDHAM.
PETER W. CLAASSEN.